US009454206B2

(12) United States Patent
Robles et al.

(10) Patent No.: US 9,454,206 B2
(45) Date of Patent: Sep. 27, 2016

(54) POWER MANAGEMENT TECHNIQUES FOR COMPUTER-READABLE STORAGE DEVICES

(71) Applicant: NetApp, Inc., Sunnyvale, CA (US)

(72) Inventors: David Robles, Sunnyvale, CA (US); George Totolos, Cranberry Township, PA (US); Joshua Silberman, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 308 days.

(21) Appl. No.: 14/143,130

(22) Filed: Dec. 30, 2013

(65) Prior Publication Data

US 2015/0185799 A1 Jul. 2, 2015

(51) Int. Cl.
*G06F 1/32* (2006.01)

(52) U.S. Cl.
CPC .............. *G06F 1/3206* (2013.01); *G06F 1/32* (2013.01); *G06F 1/3275* (2013.01)

(58) Field of Classification Search
CPC ....... G06F 1/3206; G06F 1/3275; G06F 1/32
See application file for complete search history.

(56) References Cited

U.S. PATENT DOCUMENTS

| 8,533,403 | B1* | 9/2013 | Law ................. G06F 13/1605 711/105 |
| 8,788,779 | B1* | 7/2014 | Horn ................. G06F 3/0616 711/103 |
| 9,207,744 | B2* | 12/2015 | Li ........................ G06F 1/3234 |
| 9,235,665 | B2* | 1/2016 | Stelmakh .............. G06F 1/3275 |
| 2006/0179334 | A1* | 8/2006 | Brittain ................. G06F 1/206 713/320 |
| 2013/0097433 | A1* | 4/2013 | Boorman .............. G06F 1/3225 713/300 |

* cited by examiner

*Primary Examiner* — Stefan Stoynov
(74) *Attorney, Agent, or Firm* — LeClairRyan, a Professional Corporation

(57) ABSTRACT

Improved power management techniques for computer-readable storage devices are described. In one embodiment, for example, an apparatus may comprise a plurality of logical storage devices and a controller to manage operations of the plurality of logical storage devices, the controller comprising a configuration component to configure a global power consumption threshold defining an overall power consumption budget for the plurality of logical storage devices, a tracking component to maintain a global power consumption tally comprising an estimated total power consumption level for the plurality of logical storage devices, and an arbitration component to resolve an operation request based on the global power consumption threshold and the global power consumption tally. Other embodiments are described and claimed.

20 Claims, 7 Drawing Sheets

FIG. 5

Storage Medium 500

*Computer Executable Instructions for 400*

POWER MANAGEMENT TECHNIQUES FOR COMPUTER-READABLE STORAGE DEVICES

BACKGROUND

According to conventional techniques for designing solid-state computer-readable storage devices, a number of discrete storage modules, such as NAND modules, may be selected such that an overall power consumption budget will not be exceeded even if each storage module operates at a maximum power consumption level simultaneously. In practice, such storage modules may rarely all operate at maximum power at the same time. As such, a storage device designed according to such conventional techniques may frequently have excess power at its disposal that goes unused. Implementing a scheme for tracking device power consumption levels may make it possible to include an increased number of storage modules in the storage device, in order to increase performance and more completely utilize available power.

BRIEF DESCRIPTION OF THE DRAWINGS

FIG. 5 illustrates one embodiment of a storage medium.

DETAILED DESCRIPTION

Various embodiments may be generally directed to improved power management techniques for computer-readable storage devices. In one embodiment, for example, an apparatus may comprise a plurality of logical storage devices and a controller to manage operations of the plurality of logical storage devices, the controller comprising a configuration component to configure a global power consumption threshold defining an overall power consumption budget for the plurality of logical storage devices, a tracking component to maintain a global power consumption tally comprising an estimated total power consumption level for the plurality of logical storage devices, and an arbitration component to resolve an operation request based on the global power consumption threshold and the global power consumption tally. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
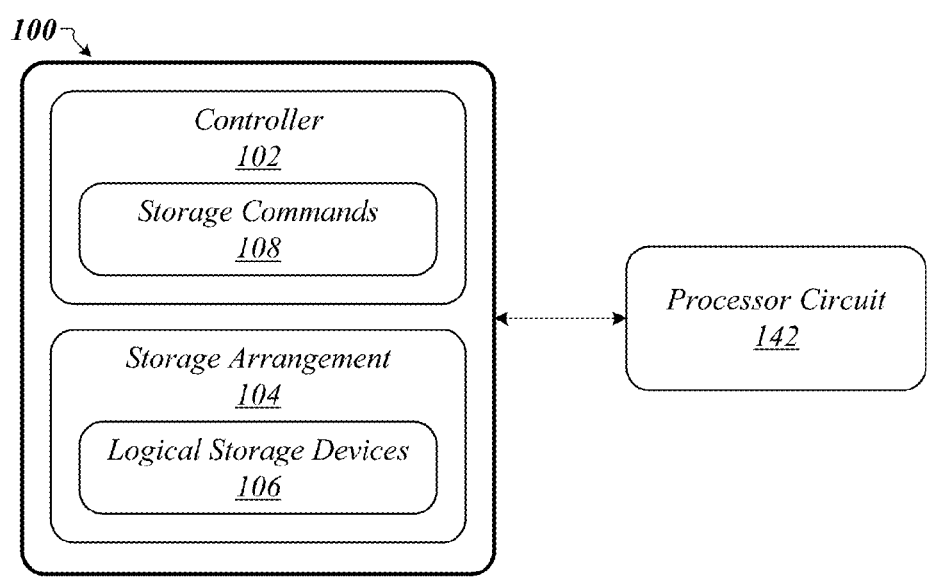
FIG. 1 illustrates one embodiment of an operating environment.

FIG. 1 illustrates one embodiment of an operating environment such as may be representative of various embodiments. As shown in FIG. 1, an apparatus 100 comprises a controller 102 and a storage arrangement 104. The apparatus 100 may comprise a solid-state storage device for use by a computing device. For example, in some embodiments, apparatus 100 may comprise a memory card, such as a flash memory card. Storage arrangement 104 may comprise an arrangement of a plurality of logical storage devices 106. In various embodiments, each logical storage device 106 may comprise storage circuitry in a discrete package, component, or module. For example, in some embodiments, each logical storage device 106 may comprise a NAND storage module. The embodiments are not limited to this example.

In various embodiments, storage arrangement 104 may comprise an arrangement of logical storage devices 106 on a board, card, or other type of support structure. For example, in some embodiments, storage arrangement 104 may comprise one or more arrays of logical storage devices 106 on a memory card. It is worthy of note that although storage arrangement 104 may comprise, for example, a grid or array of logical storage devices 106 in various embodiments, the embodiments are not so limited. In some other embodiments, storage arrangement 104 may comprise logical storage devices 106 that are not arranged according to any particular pattern, and the embodiments are not limited in this context.

In various embodiments, controller 102 may comprise circuitry operative to manage storage operations performed by the logical storage devices 106 of storage arrangement 104. In some embodiments, controller 102 may be operative to manage storage operations of logical storage devices 106 based on storage commands 108. Each storage command 108 may comprise a command instruction a logical storage device 106 to perform a particular operation, such as a read operation, a write operation, or an erase operation. In various embodiments, controller 102 may be operative to generate storage commands 108 based on instructions received from an external device. For example, in some embodiments, an operating system executing on a processor circuit 142 may generate instructions in order to store data in apparatus 100 and/or read stored data from apparatus 100, apparatus 100 may be operative to receive the instructions from the processor circuit 142, and controller 102 may be operative to generate storage commands 108 based on the instructions. The embodiments are not limited to these examples.

In various embodiments, apparatus 100 may have a particular amount of power available to it for consumption during normal operations. For example, in some embodiments, apparatus 100 may connect to a power supply through an interface that enables it to consume up to 25 W of power. Exceeding such a power consumption budget may result in dropped operations, data corruption, and/or other undesirable effects. As such, it may be desirable to employ power management techniques to ensure that the power consumption of apparatus 100 does not exceed its power consumption budget.

In various embodiments, depending on the number and/or type operations that they perform, different logical storage devices 106 may consume different amounts of power at any particular point in time. A conventional approach to observing a power consumption budget may involve determining an estimated single-device maximum amount of power that any particular logical storage device 106 might be expected to consume, and then selecting a number of logical storage devices 106 to include in storage arrangement 104 such that the power consumption budget will not be exceeded even if all of the logical storage devices 106 consume the single-device maximum amount of power. For example, according to such a conventional technique, if apparatus 100 has an overall power consumption budget of 25 W, components other than logical storage devices 106 consume negligible power, and it is estimated that any particular logical storage device 106 will consume at most 1 W of power at any particular point in time, then 25 logical storage devices 106 may be included in storage arrangement 104. This may help to ensure that the overall power consumption of apparatus 100 does not exceed the budget of 25 W. However, in some embodiments, it may often be the case at any particular point in time that not all of logical storage devices 106 consume the single-device maximum amount of power. As such, there may frequently be allocated power available to apparatus 100 that it does not use—power that could be used to perform operations on additional logical storage devices 106 if they were present.

Disclosed herein are improved power management techniques according to which apparatus 100 may comprise a greater number of logical storage devices 106 than that indicated by the conventional "worst-case" calculation, in order to enable apparatus 100 to put such available power to use. According to such improved techniques, the actual power consumption levels of logical storage devices 106, storage arrangement 104, and/or apparatus 100 may be estimated on an ongoing basis, and the operations of logical storage devices 106 may be controlled in order to maintain an overall power consumption level that complies with the overall power consumption budget. In various embodiments, application of these techniques may yield improvements in performance and/or storage density. Other advantages may be associated with some embodiments, and the embodiments are not limited in this context.

Figure 2:
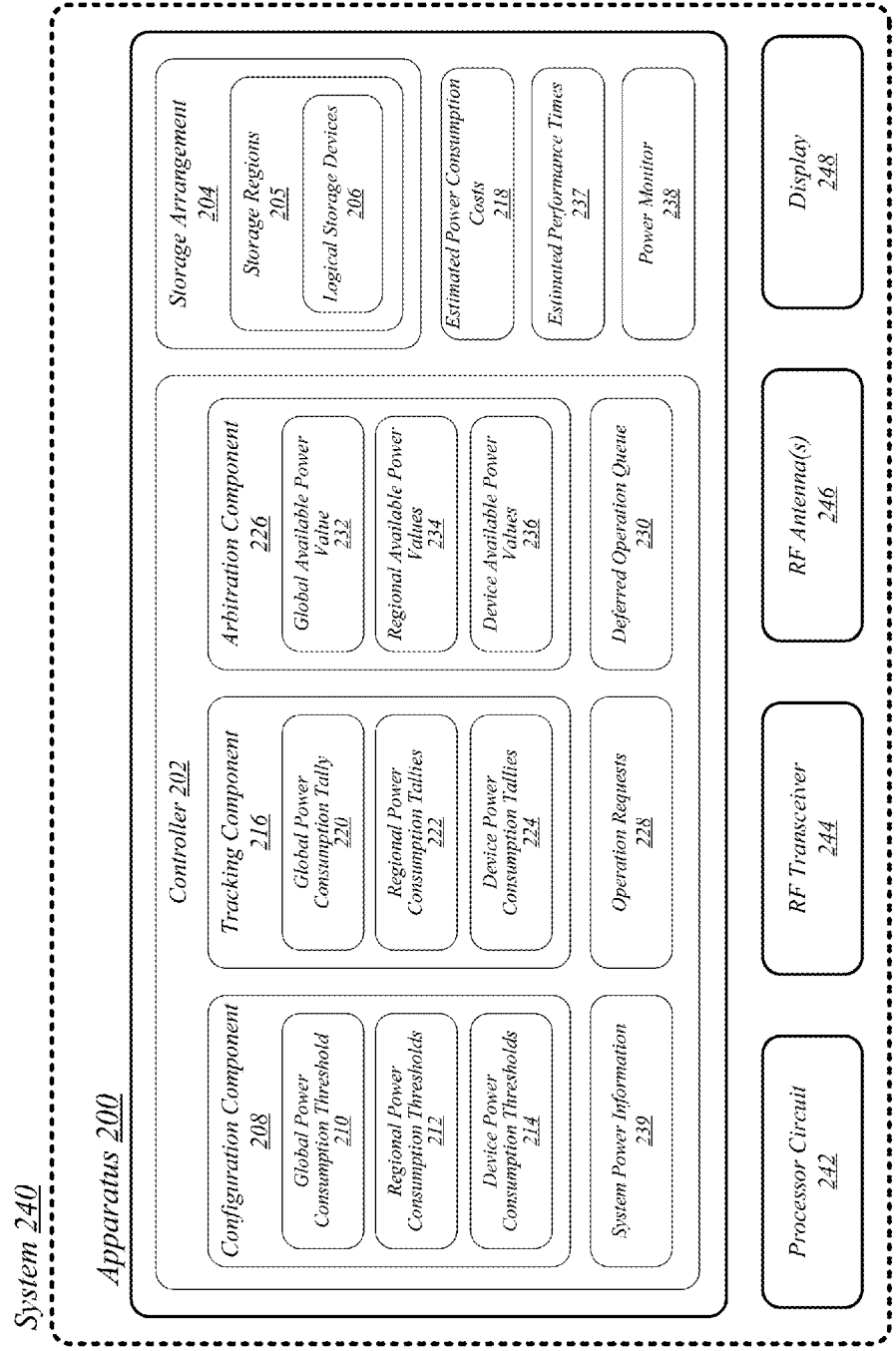
FIG. 2 illustrates one embodiment of an apparatus and one embodiment of a first system.

FIG. 2 illustrates a block diagram of an apparatus 200 that may implement improved power management techniques in various embodiments. As shown in FIG. 2, apparatus 200 comprises multiple elements including a controller 202 and a storage arrangement 204. The embodiments, however, are not limited to the type, number, or arrangement of elements shown in this figure. Storage arrangement 204 may comprise an arrangement of a plurality of logical storage devices 206, and may be the same as or similar to storage arrangement 104 of FIG. 1. Controller 202 may comprise circuitry operative to manage storage operations of the logical storage devices 206 according to the improved power management techniques.

In some embodiments, controller 202 may comprise a configuration component 208. Configuration component 208 may comprise logic, circuitry, and/or instructions operative to configure one or more power consumption thresholds, each of which may define a power consumption budget for a respective set of logical storage devices 206. As used herein, unless explicitly otherwise indicated, the term "set" denotes a group of one or more.

In various embodiments, configuration component 208 may be operative to configure a global power consumption threshold 210. Global power consumption threshold 210 may define an overall power consumption budget for the plurality of logical storage devices 206 in storage arrangement 204. For example, global power consumption threshold 210 may define an overall power consumption budget of 25 W for the plurality of logical storage devices 206. The embodiments are not limited to this example.

In some embodiments, configuration component 208 may additionally or alternatively be operative to configure one or more regional power consumption thresholds 212. Each regional power consumption threshold 212 may define a collective power consumption budget for logical storage devices 206 located within a respective storage region 205 of storage arrangement 204. For example, if storage arrangement 204 comprises two main physical groupings of logical storage devices 206, configuration component 208 may be operative to configure regional power consumption thresholds 212-1 and 212-2 defining collective power consumption budgets for the respective groupings. In various embodiments, any particular regional power consumption threshold 212 may define a collective power consumption budget for each of multiple storage regions 205. With respect to the previous example, rather than configuring respective regional power consumption thresholds 212-1 and 212-2 for the two main groupings of logical storage devices 206, configuration component 208 may be operative to configure a single regional power consumption threshold 212 that applies to both of the groupings. The embodiments are not limited in this context.

It is worthy of note that the various storage regions 205 to which regional power consumption thresholds 212 correspond may or may not be defined according to the physical positioning of logical storage devices 206. For example, in some embodiments, logical storage devices 206 may comprise devices of more than one type, and configuration component 208 may be operative to configure respective regional power consumption thresholds 212 for each logical storage device type, without regard for their physical positioning. Furthermore, the various storage regions 205 may not necessarily be mutually exclusive of each other, and any particular logical storage device 206 may reside in multiple storage regions 205. For example, in various embodiments, a storage region 205 may comprise a subset of another storage region 205, or may include logical storage devices 206 comprised in multiple other storage regions 205. The embodiments are not limited in this context.

In some embodiments, configuration component 208 may additionally or alternatively be operative to configure one or more device power consumption thresholds 214. Each device power consumption threshold 214 may define a power consumption budget for each of one or more logical storage devices 206. In various embodiments, configuration component 208 may be operative to configure a device power consumption threshold 214 that applies to each logical storage device 206 in storage arrangement 204. In some other embodiments, configuration component 208 may be operative to configure separate device power consumption thresholds 214 for each of the logical storage devices 206 in storage arrangement 204. In yet other embodiments, configuration component 208 may be operative to configure different device power consumption thresholds 214 for each of the logical storage devices 206 in multiple respective groups thereof. For example, in various embodiments, configuration component 208 may be operative to configure a device power consumption threshold 214-1 that applies to each of a first group of logical storage devices 206, and may be operative to configure a device power consumption threshold 214-2 that applies to each of a second group of logical storage devices 206. In still other embodiments, configuration component 208 may be operative to configure some device power consumption thresholds 214 that apply to single logical storage devices 206 and to configure other device power consumption thresholds 214 that apply to each of multiple logical storage devices 206. The embodiments are not limited in this context.

In some embodiments, controller 202 may comprise a tracking component 216. Tracking component 216 may comprise logic, circuitry, and/or instructions operative to maintain one or more power consumption tallies, each of which may comprise an estimated total power consumption level for a respective set of logical storage devices 206. Any particular power consumption tally may comprise an estimate of an amount of power that a set of logical storage devices 206 is currently consuming. When a logical storage device 206 in the set begins performing an operation, tracking component 216 may increment the power consumption tally in order to reflect the increased power consumption associated with performance of the operation. Likewise, when the logical storage device 206 in the set completes the operation, tracking component 216 may decrement the power consumption tally accordingly. The embodiments are not limited in this context.

In various embodiments, tracking component 216 may be operative to maintain the one or more power consumption tallies based on estimated power consumption costs 218. Estimated power consumption cost 218 may comprise estimates of amounts of power consumed by various operations that logical storage devices 206 may perform in conjunction with their use as storage. In an example embodiment, logical storage devices 206 may perform "ERASE," "WRITE_ARRAY," "WRITE_IO," "READ_ARRAY," and "READ_IO" operations during use, and estimated power consumption costs 218 may comprise estimates of amounts of power consumed by each of these operations. In some embodiments, when a logical storage device 206 in a set corresponding to a particular power consumption tally begins performing an operation, tracking component 216 may increment the power consumption tally by an estimated power consumption cost 218 for the operation. Likewise, when the logical storage device 206 in the set completes the operation, tracking component 216 may decrement the power consumption tally by the estimated power consumption cost 218 for the operation. The embodiments are not limited in this context.

In various embodiments, estimated power consumption costs 218 may be specific to apparatus 200. For example, in some embodiments, estimated power consumption costs 218 for each operation may be empirically determined based on testing of apparatus 200. In various such embodiments, configuration component 208 may be operative to perform a calibration sequence in order to determine estimated power consumption costs 218. In other embodiments, estimated power consumption costs 218 may be generic to apparatus 200, and may comprise values that are used by each of a plurality of like or similar apparatuses 200. The embodiments are not limited in this context.

In some embodiments, estimated power consumption costs 218 may be statically configured for apparatus 200. For example, in various embodiments, apparatus 200 may be statically configured with estimated power consumption costs 218 prior to initial use, and the estimated power consumption costs 218 may not be subject to subsequent modification. In some other embodiments, however, apparatus 200 may be capable of dynamically reconfiguring estimated power consumption costs 218. For example, with respect to the aforementioned embodiments in which configuration component 208 is capable of performing a calibration sequence, configuration component 208 may be capable of repeating the calibration sequence in order to dynamically reconfigure estimated power consumption costs 218.

In various embodiments, estimated power consumption costs 218 may comprise estimated amounts of power consumption that are universal to the plurality of logical storage devices 206 in storage arrangement 204. However, in some other embodiments, some or all of estimated power consumption costs 218 may be specific to particular logical storage devices 206 or groups of logical storage devices 206. For example, in various embodiments, storage arrangement 204 may comprise logical storage devices 206 of two different types, and estimated power consumption costs 218 may comprise a set of estimates for logical storage devices 206 of the first type and a different set of estimates for logical storage devices 206 of the second type. The embodiments are not limited to this example.

In some embodiments, tracking component 216 may be operative to maintain a global power consumption tally 220. Global power consumption tally 220 may comprise an estimated total power consumption level for all of the logical storage devices 206 in storage arrangement 204. In various embodiments, each time a logical storage device 206 begins performing an operation, tracking component 216 may be operative to increment the global power consumption tally 220 by an estimated power consumption cost 218 for the operation. Likewise, in some embodiments, each time a logical storage device 206 completes an operation, tracking component 216 may be operative to decrement the global power consumption tally 220 by an estimated power consumption cost 218 for the operation. The embodiments are not limited in this context.

In various embodiments, tracking component 216 may additionally or alternatively be operative to maintain one or more regional power consumption tallies 222. Each regional power consumption tally 222 may comprise an estimated collective power consumption level for the logical storage devices 206 within in a respective storage region 205 of storage arrangement 204. For example, if storage arrangement 204 comprises storage regions 205-1 and 205-2, tracking component 216 may be operative to maintain regional power consumption tallies 222-1 and 222-2 comprising estimated collective power consumption levels for the logical storage devices 206 in the respective storage regions 205-1 and 205-2. In some embodiments, each time a logical storage device 206 in any particular storage region 205 begins performing an operation, tracking component 216 may be operative to increment a regional power consumption tally 222 for that storage region 205 by an estimated power consumption cost 218 for the operation. Likewise, in various embodiments, each time a logical storage device 206 in any particular storage region 205 completes an operation, tracking component 216 may be operative to decrement a regional power consumption tally 222 for that storage region 205 by an estimated power consumption cost 218 for the operation. The embodiments are not limited in this context.

In some embodiments, tracking component 216 may additionally or alternatively be operative to maintain one or more device power consumption tallies 224. Each device power consumption tally 224 may comprise an estimated power consumption level of a particular logical storage device 206. In various embodiments, any particular logical storage device 206 may be capable of performing multiple operations at the same time, and a device power consumption tally 224 for that logical storage device 206 may comprise an estimated collective power consumption level associated with all of the operations being performed at that device. In some embodiments, each time any particular logical storage device 206 begins performing an operation, tracking component 216 may be operative to increment a device power consumption tally 224 for that logical storage device 206 by an estimated power consumption cost 218 for the operation. Likewise, in various embodiments, each time any particular logical storage device 206 completes an operation, tracking component 216 may be operative to decrement a device power consumption tally 224 for that logical storage device 206 by an estimated power consumption cost 218 for the operation. The embodiments are not limited in this context.

It is to be appreciated that in some embodiments, the initiation or completion of an operation at any particular logical storage device 206 may effect multiple power consumption tallies. For example, in various embodiments, when a particular logical storage device 206 begins performing an operation, tracking component 216 may be operative to increment a device power consumption tally 224 for the logical storage device 206, to increment one or more regional power consumption tallies 222 for one or more respective storage regions 205 that contain the logical storage device 206, and to increment a global power consumption tally 220. The embodiments are not limited to this example.

In some embodiments, apparatus 200 may comprise an arbitration component 226. Arbitration component 226 may comprise logic, circuitry, and/or instructions operative to receive and resolve one or more operation requests 228. Each operation request 228 may comprise information identifying a logical storage device 206 and an operation to be performed by the logical storage device 206. In an example embodiment, each operation request 228 may indicate that a specified logical storage device 206 is to perform an "ERASE," "WRITE_ARRAY," "WRITE_IO," "READ_ARRAY," or "READ_IO" operation. The embodiments are not limited to these examples.

In various embodiments, arbitration component 226 may be operative to resolve each operation request 228 by either granting or deferring the operation request 228. In some embodiments, when arbitration component 226 approves an operation request 228, it may be operative to instruct a logical storage device 206 identified in the operation request 228 to perform an operation identified in the operation request 228. In various embodiments, when arbitration component 226 defers an operation request 228, it may be operative to place the operation request 228 in a deferred operation queue 230, for performance at a future point in time. In some embodiments, arbitration component 226 may be operative to deny one or more operation requests 228 rather than placing them in deferred operation queue 230. The embodiments are not limited in this context.

In various embodiments, arbitration component 226 may be operative to resolve each operation request 228 based on one or more power consumption thresholds, one or more power consumption tallies, and an estimated power consumption cost 218 for an operation identified by the operation request 228. In some embodiments, arbitration component 226 may be operative to determine, based on the estimated power consumption cost 218, whether performing the operation will cause any one the one or more power consumption tallies to exceed its corresponding power consumption threshold. In various such embodiments, arbitration component 226 may be operative to determine one or more available power values based on the one or more power consumption thresholds and one or more power consumption tallies, and to resolve the operation request 228 by comparing the estimated power consumption cost 218 with each of the one or more available power values. The embodiments are not limited in this context.

In some embodiments, arbitration component 226 may be operative to resolve any particular operation request 228 based on global power consumption threshold 210, global power consumption tally 220, and an estimated power consumption cost 218 for the operation identified in the operation request 228. In various embodiments, arbitration component 226 may be operative to determine, based on the estimated power consumption cost 218, whether performing the operation will cause global power consumption tally 220 to exceed global power consumption threshold 210. In some such embodiments, arbitration component 226 may be operative to calculate a global available power value 232 comprising a difference between global power consumption threshold 210 and global power consumption tally 220, and to compare the estimated power consumption cost 218 for the operation to the global available power value 232. When the estimated power consumption cost 218 exceeds the global available power value 232, arbitration component 226 may be operative to defer or deny the operation request 228. When the global available power value 232 is greater than or equal to the estimated power consumption cost 218, arbitration component 226 may be operative to grant the operation request 228. The embodiments are not limited in this context.

In various embodiments, arbitration component 226 may be operative to resolve any particular operation request 228 based on one or more regional power consumption thresholds 212, one or more regional power consumption tallies 222, and an estimated power consumption cost 218 for the operation identified in the operation request 228. In some embodiments, arbitration component 226 may be operative to determine one or more storage regions 205 that comprise the logical storage device 206 identified by the operation request 228. In various such embodiments, arbitration component 226 may be operative to determine, for each of the one or more storage regions 205, whether performing the operation will cause a regional power consumption tally 222 for that storage region 205 to exceed a regional power consumption threshold 212 for that storage region 205.

In some embodiments, arbitration component 226 may be operative to calculate one or more regional available power values 234, each of which may correspond to a respective one of the one or more storage regions 205 that comprise the logical storage device 206 identified by the operation request 228. For each storage region 205, the corresponding regional available power value 234 may comprise a difference between a regional power consumption threshold 212 for that storage region 205 and a regional power consumption tally 222 for that storage region 205. In various embodiments, arbitration component 226 may be operative to compare the estimated power consumption cost 218 of the operation identified by the operation request 228 with each of the one or more regional available power values 234. When the estimated power consumption cost 218 exceeds any of the one or more regional available power values 234, arbitration component 226 may be operative to defer or deny the operation request 228. When each of the one or more regional available power values 234 is greater than or equal to the estimated power consumption cost 218, arbitration component 226 may be operative to grant the operation request 228. The embodiments are not limited in this context.

In various embodiments, arbitration component 226 may be operative to resolve any particular operation request 228 based on a device power consumption threshold 214, a device power consumption tally 224, and an estimated power consumption cost 218 for the operation identified in the operation request 228. In some embodiments, arbitration component 226 may be operative to determine, based on the estimated power consumption cost 218, whether performing the operation will cause a device power consumption tally 224 for the logical storage device 206 identified in the operation request 228 to exceed a device power consumption threshold 214 for that logical storage device 206. In various such embodiments, arbitration component 226 may be operative to calculate a device available power value 236 comprising a difference between the device power consumption threshold 214 and the device power consumption tally 224 for the logical storage device 206. When the estimated power consumption cost 218 exceeds the device available power value 236, arbitration component 226 may be operative to defer or deny the operation request 228. When the device available power value 236 is greater than or equal to the estimated power consumption cost 218, arbitration component 226 may be operative to grant the operation request 228. The embodiments are not limited in this context.

It will be appreciated that in some embodiments, the determination of whether to grant a particular operation request 228 may involve comparing an estimated power consumption cost 218 of an operation identified by the operation request 228 with multiple available power values, which may or may not be associated with varying levels of granularity. In an example embodiment, arbitration component 226 may be operative to determine whether to grant any particular operation request 228 by comparing an estimated power consumption cost 218 of an operation identified by the operation request 228 with each of a global available power value 232, a regional available power value 234, and a device available power value 236. In another example embodiment, arbitration component 226 may be operative to determine whether to grant any particular operation request 228 by comparing an estimated power consumption cost 218 of an operation identified by the operation request 228 with each of multiple regional available power values 234 corresponding to multiple storage regions 205 that each comprise the logical storage device 206 identified by the operation request 228. It is to be understood that numerous variations are both possible and contemplated in this respect, and that the embodiments are not limited in this context.

In various embodiments, when arbitration component 226 grants any particular operation request 228 for performance of an operation by a logical storage device 206, tracking component 216 may be operative to update one or more power consumption tallies in order to reflect the estimated power consumption associated with ongoing performance of the operation by the logical storage device 206. In some embodiments, for example, tracking component 216 may be operative to increment global power consumption tally 220, one or more regional power consumption tallies 222 for storage regions 205 containing the logical storage device 206, and/or a device power consumption tally 224 for the logical storage device 206. More particularly, in various embodiments, tracking component 216 may be operative to increment any or all of these power consumption tallies by the estimated power consumption cost 218 for the operation being performed by the logical storage device 206. The embodiments are not limited in this context.

In some embodiments, tracking component 216 may be operative to update the various power consumption tallies on an ongoing basis to reflect the completion of operations performed by logical storage devices 206. In various embodiments, in order to reflect the completion of a particular operation by a particular logical storage device 206, tracking component 216 may be operative to decrement global power consumption tally 220, one or more regional power consumption tallies 222 for storage regions 205 containing the logical storage device 206, and/or a device power consumption tally 224 for the logical storage device 206. More particularly, in some embodiments, tracking component 216 may be operative to decrement any or all of these power consumption tallies by the estimated power consumption cost 218 for the operation performed by the logical storage device 206. The embodiments are not limited in this context.

In various embodiments, controller 202 may be operative to periodically poll logical storage devices 206 to determine whether they have completed any assigned operations. In some such embodiments, when a logical storage device 206 reports that it has completed an operation, tracking component 216 may be operative to decrement one or more power consumption tallies accordingly. In various embodiments, there may be a latency associated with such periodic polling. More particularly, for a particular operation performed by a particular logical storage device 206, the latency may comprise a difference between a time at which the operation actually completes and a time at which the logical storage device 206 is polled and reports the completion of the operation.

In some embodiments, rather than relying on polling performed by controller 202, tracking component 216 may be operative to implement a timing scheme in order to predict the times of completion for operations performed by logical storage devices 206, and may update one or more power consumption tallies accordingly. In various embodiments, for example, tracking component 216 may be operative to update one or more power consumption tallies based on estimated performance times 237. Estimated performance times 237 may comprise estimates of average amounts of time required by logical storage devices 206 to perform various operations. In some embodiments, when a logical storage device 206 begins performing an operation, tracking component 216 may start a timer or counter. Subsequently, when the timer or counter indicates that the amount of time that has elapsed since commencement of the operation has reached an estimated performance time 237 for the operation, tracking component 216 may decrement one or more power consumption tallies to reflect completion of the operation. One advantage of various such embodiments may be that latencies associated with polling may be avoided, power "credits" may be freed more quickly for use in performance of new operations, and performance may thus be increased. Other advantages may be associated with some embodiments, and the embodiments are not limited in this context.

In various embodiments, estimated performance times 237 may be specific to apparatus 200. For example, in some embodiments, estimated performance times 237 for each operation may be empirically determined based on testing of apparatus 200. In various such embodiments, configuration component 208 may be operative to perform a calibration sequence in order to determine estimated performance times 237. In other embodiments, estimated performance times 237 may be generic to apparatus 200, and may comprise values that are used by each of a plurality of like or similar apparatuses 200. The embodiments are not limited in this context.

In some embodiments, apparatus 200 may be capable of dynamically reconfiguring estimated performance times 237. For example, with respect to the aforementioned embodiments in which configuration component 208 is capable of performing a calibration sequence, configuration component 208 may be capable of repeating the calibration sequence in order to dynamically reconfigure estimated performance times 237. In various other embodiments, estimated performance times 237 may be statically configured for apparatus 200. The embodiments are not limited in this context.

In some embodiments, estimated performance times 237 may be universal to the plurality of logical storage devices 206 in storage arrangement 204. However, in various other embodiments, some or all of estimated performance times 237 may be specific to particular logical storage devices 206 or groups of logical storage devices 206. For example, in some embodiments, storage arrangement 204 may comprise logical storage devices 206 of two different types, and estimated performance times 237 may comprise a set of estimates for logical storage devices 206 of the first type and a different set of estimates for logical storage devices 206 of the second type. The embodiments are not limited to this example.

In various embodiments, arbitration component 226 may be operative to supplement the information maintained by tracking component 216 with real-time power consumption measurements. For example, in some embodiments, apparatus 200 may comprise a power monitor 238 capable of performing real-time measurements of the overall power consumption level of apparatus 200 and/or storage arrangement 204. In some embodiments, real-time measurements provided by power monitor 238 may provide arbitration component 226 with an enhanced and/or more accurate awareness of the power consumption in apparatus 200, which may enable more aggressive operation scheduling and yield improvements in performance optimization. In various embodiments, arbitration component 226 may be operative to defer or deny any operation requests 228 that it expects, based on the real-time measurements and on estimated power consumption costs 218, will cause an overall power budget for apparatus 200 and/or storage arrangement 204 to be exceeded. The embodiments are not limited in this context.

In some embodiments, apparatus 200 may perform one or more of the aforementioned processes based on system power information 239. System power information 239 may comprise information specifying rules, constraints, and/or characteristics for the power management performed by apparatus 200. For example, in various embodiments, system power information 239 may indicate an overall power budget for apparatus 200. In some embodiments, apparatus 200 may be comprised within a system 240, and may receive system power information 239 from one or more other components of system 240, such as a processor circuit 242. The embodiments are not limited in this context.

In various embodiments, controller 202 may be operative to utilize system power information 239 to select from among multiple power management configurations. In some embodiments, each power management configuration may define power consumption thresholds, estimated power consumption costs, operation request resolution rules, and/or other information for use by apparatus 200. In various embodiments, each power management configuration may correspond to a predefined class of behavior that may be appropriate for application in particular operating environments or conditions. In some embodiments, system power information 239 may indicate operating environments or conditions for which a particular class of behavior is appropriate, and controller 202 may select a power management configuration corresponding to that class of behavior. In an example, a global system controller for a system comprising apparatus 200 may be capable of dynamic power negotiation with system components such as apparatus 200, and may provide apparatus 200 with system power information 239 that indicates that the system has entered a power saving mode and that apparatus 200 should operate accordingly. Apparatus 200 may then be operative to select a reduced-power mode, and configuration component 208 may be operative to configure one or more reduced power consumption thresholds in conjunction with the reduced-power mode. The embodiments are not limited to this example.

As noted above, in various embodiments, apparatus 200 may be comprised within a system 240. System 240 may comprise any of the aforementioned elements of apparatus 200. System 240 may further comprise a processor circuit 242. Processor circuit 242 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 242 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited in this context.

In various embodiments, system 240 may comprise a radio frequency (RF) transceiver 244. RF transceiver 244 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 244 may operate in accordance with one or more applicable standards in any version. The embodiments are not limited in this context.

In some embodiments, system 240 may comprise one or more RF antennas 246. Examples of any particular RF antenna may include an internal antenna, an omni-directional antenna, a monopole antenna, a dipole antenna, an end-fed antenna, a circularly polarized antenna, a microstrip antenna, a diversity antenna, a dual antenna, a tri-band antenna, a quad-band antenna, and so forth. The embodiments are not limited to these examples.

In various embodiments, system 240 may comprise a display 248. Display 248 may comprise any display device capable of displaying information received from processor circuit 242. Examples for display 248 may include a television, a monitor, a projector, and a computer screen. In one embodiment, for example, display 248 may be implemented by a liquid crystal display (LCD), light emitting diode (LED) or other type of suitable visual interface. Display 248 may comprise, for example, a touch-sensitive display screen ("touchscreen"). In various implementations, display 248 may comprise one or more thin-film transistors (TFT) LCD including embedded transistors. The embodiments, however, are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
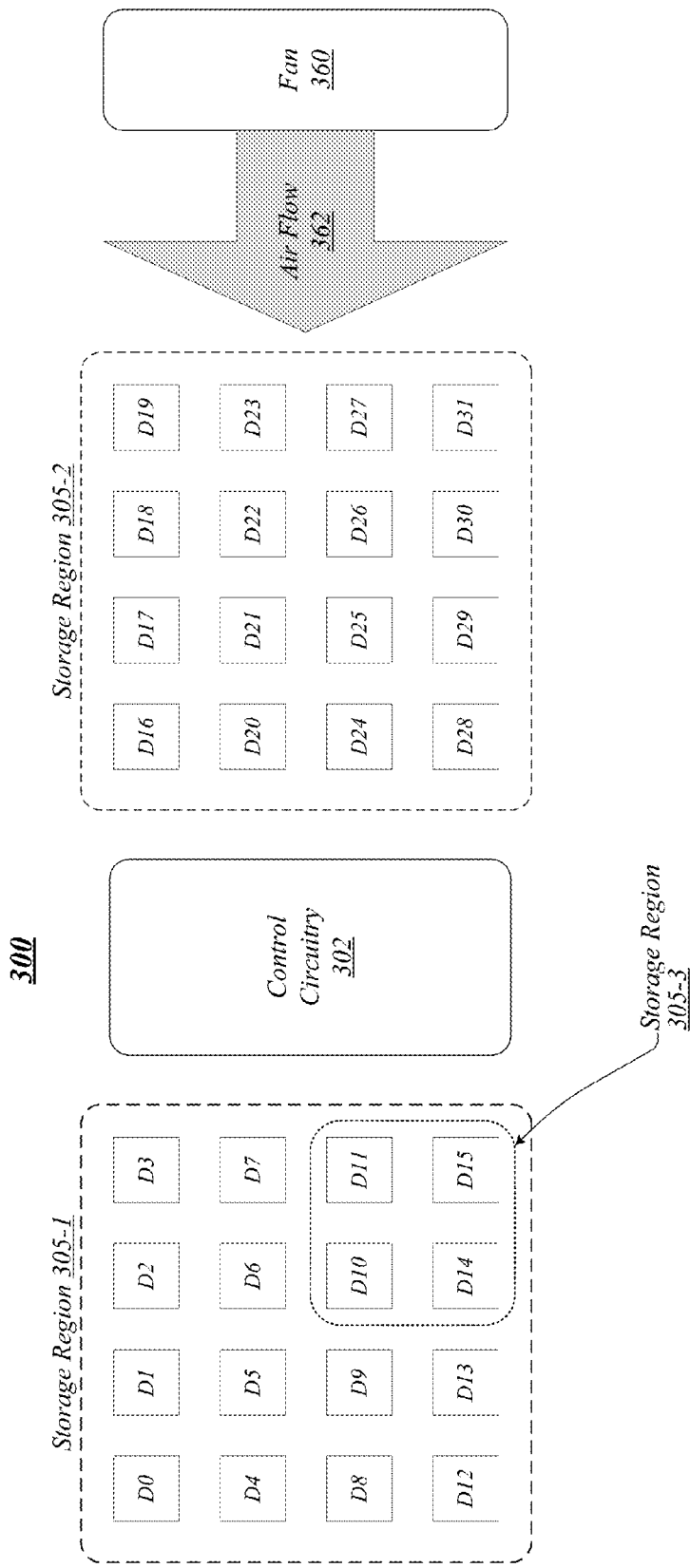
FIG. 3 illustrates one embodiment of a storage arrangement.

FIG. 3 illustrates one embodiment of a storage arrangement 300, such as may be representative of storage arrangement 204 of FIG. 2 in some embodiments. As shown in FIG. 3, storage arrangement 300 comprises two main physical groupings of logical storage devices. More particularly, storage arrangement 300 comprises a physical grouping of 16 logical storage devices—devices D0-D15—in a storage region 305-1, and comprises a grouping of another 16 logical storage devices—devices D16-D31—in a storage region 305-2. These two main physical groupings reside on opposite sides of control circuitry 302, which may comprise, for example, a controller that is the same as or similar to controller 202 of FIG. 2.

In various embodiments, control circuitry 302 may be operative to configure a regional power consumption threshold and maintain a regional power consumption tally for storage region 305-1, and may be operative to configure a different regional power consumption threshold and maintain a different regional power consumption tally for storage region 305-2. Separately managing the power consumption of these two storage regions may beneficially enable control circuitry 302 to account for effects and/or ambient conditions that may vary between the two regions. For example, if a cooling fan 360 is located on the right side of storage region 305-2, air flow 362 from the fan 360 may be cooler as it reaches storage region 305-2 than it is when it subsequently reaches storage region 305-1. Storage region 305-1 may therefore tend to run hotter than storage region 305-2. Separate management of the power consumption parameters for storage regions 305-1 and 305-2 may enable control circuitry 302 to compensate for this effect by implementing a smaller power budget for storage region 305-1 than for 305-2. In this way, control circuitry 302 may keep a temperature of storage region 305-1 within an operating limit without unnecessarily sacrificing performance in storage region 305-2.

As previously noted, in some embodiments, some storage regions may comprise subsets of other storage regions. For example, in FIG. 3, a storage region 305-3 comprises a subset of storage region 305-1, and contains logical storage devices D10, D11, D14, and D15. As such, not only may control circuitry 302 may be operative to track and manage the operations of logical storage devices D10, D11, D14, and D15 in conjunction with management of storage region 305-1, but it also may be operative to separately track and manage the operations of logical storage devices D10, D11, D14, and D15 in conjunction with management of storage region 305-3. This may enable control circuitry 302 to account for effects and/or ambient conditions that may vary between logical storage devices D10, D11, D14, and D15 and the remaining logical storage devices in storage region 305-1 and/or the logical storage devices in storage region 305-2.

In an example embodiment, the architecture of a system containing storage arrangement 300 may be such that logical storage devices D10, D11, D14, and D15 are particularly prone to overheating, and control circuitry 302 may therefore separately manage them as storage region 305-3. In another example embodiment, logical storage devices D10, D11, D14, and D15 may comprise logical storage devices of a different type than the remaining logical storage devices in storage region 305-1 and/or storage arrangement 300, and control circuitry 302 may be operative to separately manage them as storage region 305-3 in order to account for differing characteristics or parameters associated with logical storage devices D10, D11, D14, and D15. The embodiments are not limited to these examples.

Figure 4:
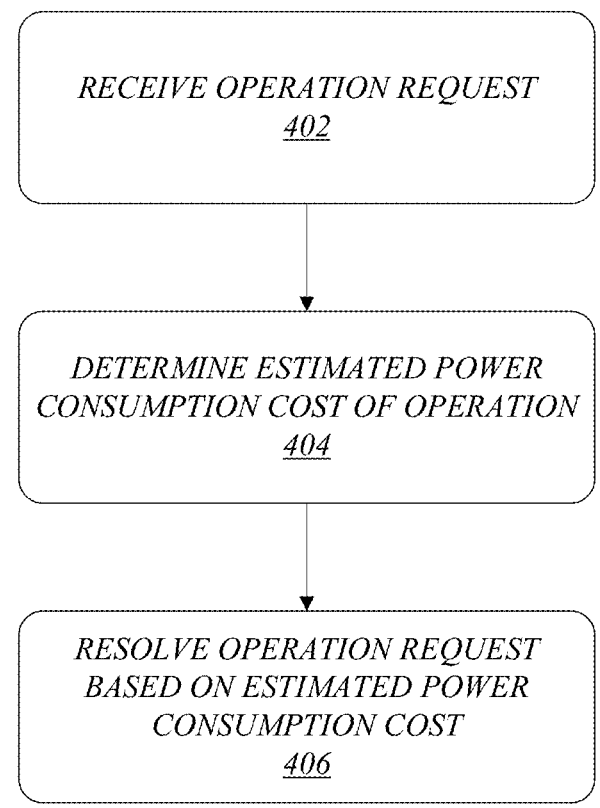
FIG. 4 illustrates one embodiment of a logic flow.

FIG. 4 illustrates one embodiment of a logic flow 400, which may be representative of the operations executed by one or more embodiments described herein. As shown in logic flow 400, an operation request may be received at 402. In various embodiments, the operation request may identify an operation to be performed by one of a plurality of logical storage devices. For example, controller 202 of FIG. 2 may be operative to receive an operation request 228 identifying an operation to be performed by a logical storage device 206 in storage arrangement 204. At 404, an estimated power consumption cost of the operation may be determined. For example, arbitration component arbitration component 226 of FIG. 2 may be operative to determine an estimated power consumption cost 218 of an operation identified by the operation request 228. At 406, the operation request may be resolved based on the estimated power consumption cost. In some embodiments, the operation request may be resolved based on the estimated power consumption cost, a global power consumption threshold, and a global power consumption tally for the plurality of logical storage devices. For example, arbitration component 226 of FIG. 2 may be operative to resolve the operation request 228 based on the estimated power consumption cost 218 for the operation, on global power consumption threshold 210, and on global power consumption tally 220. The embodiments are not limited to these examples.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement logic flow 400 of FIG. 4. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
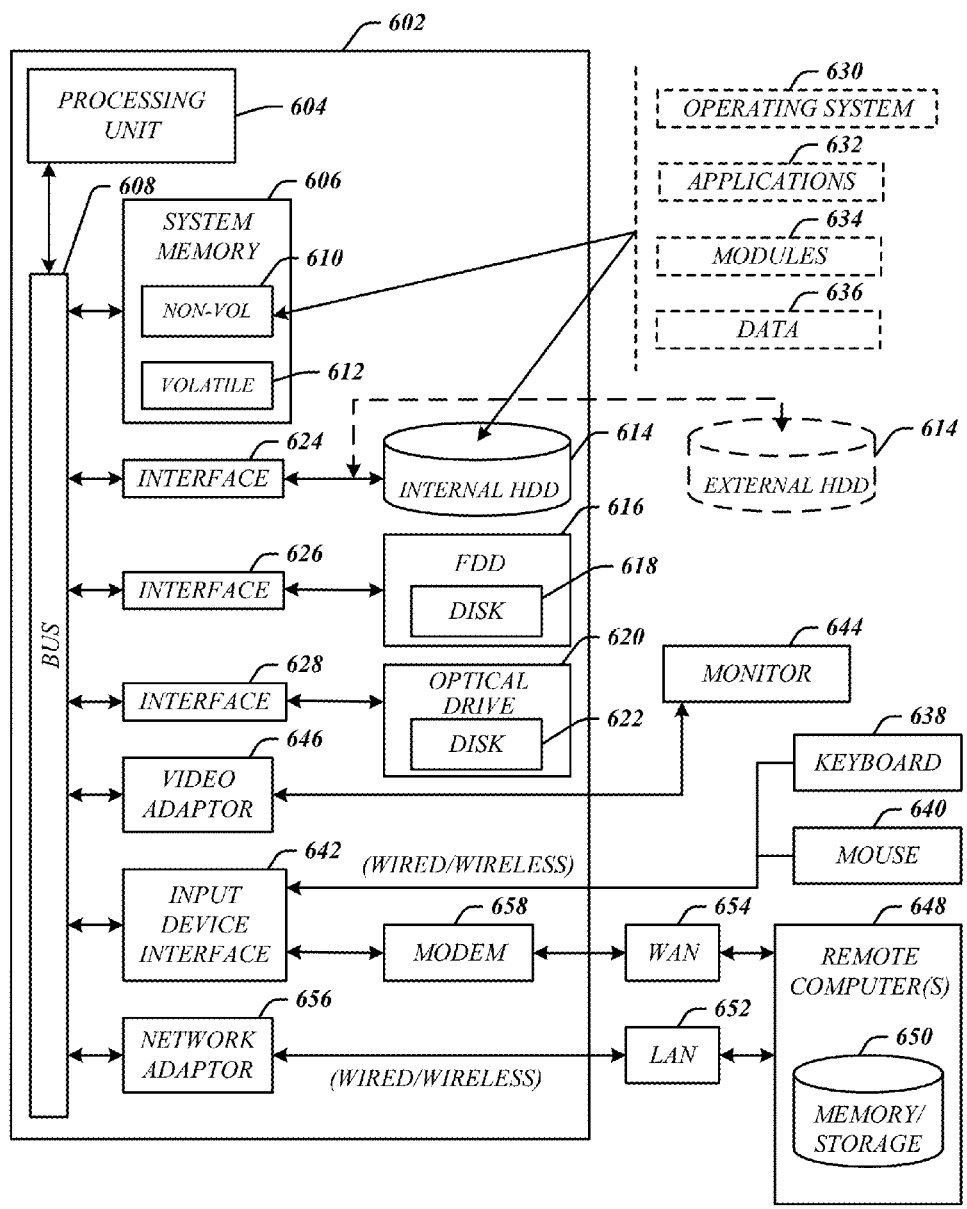
FIG. 6 illustrates an embodiment of a computing architecture.

FIG. 6 illustrates an embodiment of an exemplary computing architecture 600 suitable for implementing various embodiments as previously described. In various embodiments, the computing architecture 600 may comprise or be implemented as part of an electronic device. In some embodiments, the computing architecture 600 may be used, for example, to implement apparatus 200 and/or system 240 of FIG. 2, storage arrangement 300 of FIG. 3, logic flow 400 of FIG. 4, and/or storage medium 500 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the apparatus 200.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
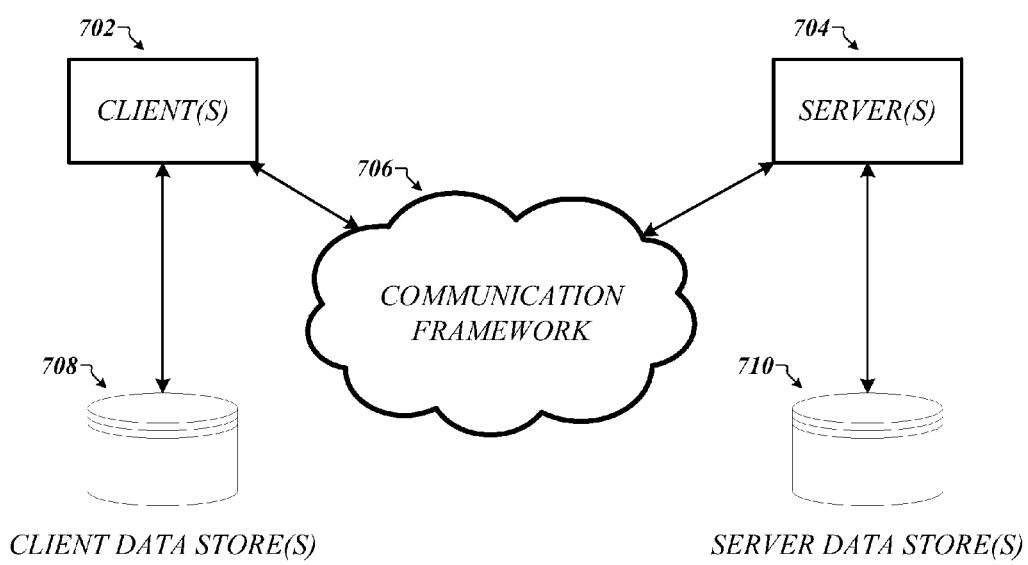
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information. Any one of clients 702 and/or servers 704 may implement 200 and/or system 240 of FIG. 2, storage arrangement 300 of FIG. 3, logic flow 400 of FIG. 4, and/or storage medium 500 of FIG. 5 in conjunction with storage of information on any of client data stores 708 and/or server data stores 710.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising: a plurality of logical storage devices; a controller to manage operations of the plurality of logical storage devices, the controller comprising: a configuration component to configure a global power consumption threshold defining an overall power consumption budget for the plurality of logical storage devices; a tracking component to maintain a global power consumption tally comprising an estimated total power consumption level for the plurality of logical storage devices; and an arbitration component to resolve an operation request based on the global power consumption threshold and the global power consumption tally.

In Example 2, the operation request of Example 1 may optionally identify an operation to be performed by one of the plurality of logical storage devices.

In Example 3, the arbitration component of Example 2 may optionally resolve the operation request based on an estimated power consumption cost of the operation.

In Example 4, the arbitration component of Example 3 may optionally calculate a global available power value comprising a difference between the global power consumption threshold and the global power consumption tally.

In Example 5, the arbitration component of Example 4 may optionally resolve the operation request based on a comparison of the estimated power consumption cost of the operation with the global available power value.

In Example 6, the arbitration component of Example 5 may optionally defer the operation when the estimated power consumption cost of the operation is greater than the global available power value.

In Example 7, the configuration component of any one of Examples 1 to 6 may optionally configure one or more regional power consumption thresholds, and each regional power consumption threshold may optionally define a collective power consumption budget for logical storage devices located within a respective region of a storage arrangement comprising the plurality of logical storage devices.

In Example 8, the tracking component of Example 7 may optionally maintain one or more regional power consumption tallies corresponding to the one or more regional power consumption thresholds, and each regional power consumption tally may optionally comprise an estimated collective power consumption level for logical storage devices located within a region associated with a corresponding regional power consumption threshold.

In Example 9, the configuration component of any one of Examples 1 to 8 may optionally configure one or more device power consumption thresholds, and each device power consumption threshold may optionally define a power consumption budget for a respective one of the plurality of logical storage devices.

In Example 10, the tracking component of Example 9 may optionally maintain one or more device power consumption tallies corresponding to the one or more device power consumption thresholds, and each device power consumption tally may optionally comprise an estimated power consumption level for a logical storage device associated with a corresponding device power consumption threshold.

In Example 11, the tracking component of any one of Examples 1 to 10 may optionally increment the global power consumption tally when the operation request is granted.

In Example 12, the tracking component of any one of Examples 1 to 11 may optionally decrement the global power consumption tally to reflect completion of an operation by one of the plurality of logical storage devices.

In Example 13, the controller of Example 12 may optionally determine the completion of the operation via periodic polling of the plurality of logical storage devices.

In Example 14, the tracking component of Example 12 may optionally decrement the global power consumption tally to reflect completion of the operation when an elapsed time since commencement of the operation reaches an estimated performance time for the operation.

In Example 15, the apparatus of any one of Examples 1 to 14 may optionally comprise a power monitor to measure a real-time power consumption level for the plurality of logical storage devices, and the arbitration component may optionally resolve the operation request based on the real-time power consumption level.

In Example 16, the controller of any one of Examples 1 to 15 may optionally receive system power information, may optionally select a power management configuration based on the system power information, and may optionally determine the global power consumption threshold based on the power management configuration.

Example 17 is a system, comprising the apparatus of Example 1 communicatively coupled with a processor circuit.

Example 18 a system according to Example 17, comprising: a display; a radio frequency (RF) transceiver; and one or more RF antennas.

Example 19 is a method, comprising: receiving an operation request identifying an operation to be performed by one of a plurality of logical storage devices; determining, by a controller circuit, an estimated power consumption cost of the operation; and resolving the operation based on the estimated power consumption cost, a global power consumption threshold, and a global power consumption tally for the plurality of logical storage devices.

In Example 20, the global power consumption threshold of Example 19 may optionally define an overall power consumption budget for the plurality of logical storage devices.

In Example 21, the global power consumption tally of any one of Examples 19 to 20 may optionally comprise an estimated total power consumption level for the plurality of logical storage devices.

In Example 22 the method of Example 21 may optionally comprise calculating a global available power value comprising a difference between the global power consumption threshold and the global power consumption tally.

In Example 23, the method of Example 22 may optionally comprise resolving the operation request based on a comparison of the estimated power consumption cost of the operation with the global available power value.

In Example 24, the method of Example 23 may optionally comprise deferring the operation when the estimated power consumption cost of the operation is greater than the global available power value.

In Example 25, the method of any one of Examples 19 to 24 may optionally comprise configuring one or more regional power consumption thresholds, and each regional power consumption threshold may optionally define a collective power consumption budget for logical storage devices located within a respective region of a storage arrangement comprising the plurality of logical storage devices.

In Example 26, the method of Example 25 may optionally comprise maintaining one or more regional power consumption tallies corresponding to the one or more regional power consumption thresholds, and each regional power consumption tally may optionally comprise an estimated collective power consumption level for logical storage devices located within a region associated with a corresponding regional power consumption threshold.

In Example 27, the method of any one of Examples 19 to 26 may optionally comprise configuring one or more device power consumption thresholds, and each device power consumption threshold may optionally define a power consumption budget for a respective one of the plurality of logical storage devices.

In Example 28, the method of Example 27 may optionally comprise maintaining one or more device power consumption tallies corresponding to the one or more device power consumption thresholds, and each device power consumption tally may optionally comprise an estimated power consumption level for a logical storage device associated with a corresponding device power consumption threshold.

In Example 29, the method of any one of Examples 19 to 28 may optionally comprise incrementing the global power consumption tally when the operation request is granted.

In Example 30, the method of any one of Examples 19 to 29 may optionally comprise decrementing the global power consumption tally to reflect completion of an operation by one of the plurality of logical storage devices.

In Example 31, the method of Example 30 may optionally comprise determining the completion of the operation via periodic polling of the plurality of logical storage devices.

In Example 32, the method of Example 30 may optionally comprise decrementing the global power consumption tally to reflect completion of the operation when an elapsed time since commencement of the operation reaches an estimated performance time for the operation.

In Example 33, the method of any one of Examples 19 to 32 may optionally comprise: measuring a real-time power consumption level for the plurality of logical storage devices; and resolving the operation request based on the real-time power consumption level.

In Example 34, the method of any one of Examples 19 to 33 may optionally comprise: receiving system power information; selecting a power management configuration based on the system power information; and determining the global power consumption threshold based on the power management configuration.

Example 35 is at least one machine-readable medium comprising a set of instructions that, in response to being executed on a computing device, cause the computing device to: receiving an operation request identifying an operation to be performed by one of a plurality of logical storage devices; determining, by a controller circuit, an estimated power consumption cost of the operation; and resolving the operation based on the estimated power consumption cost, a global power consumption threshold, and a global power consumption tally for the plurality of logical storage devices.

In Example 36, the global power consumption threshold of Example 35 may optionally define an overall power consumption budget for the plurality of logical storage devices.

In Example 37, the global power consumption tally of any one of Examples 35 to 36 may optionally comprise an estimated total power consumption level for the plurality of logical storage devices.

In Example 38, the at least one machine-readable medium of Example 37 may optionally comprise instructions that, in response to being executed on the computing device, cause the computing device to calculate a global available power value comprising a difference between the global power consumption threshold and the global power consumption tally.

In Example 39, the at least one machine-readable medium of Example 38 may optionally comprise instructions that, in response to being executed on the computing device, cause the computing device to resolve the operation request based on a comparison of the estimated power consumption cost of the operation with the global available power value.

In Example 40, the at least one machine-readable medium of Example 39 may optionally comprise instructions that, in response to being executed on the computing device, cause the computing device to defer the operation when the estimated power consumption cost of the operation is greater than the global available power value.

In Example 41, the at least one machine-readable medium of any one of Examples 35 to 40 may optionally comprise instructions that, in response to being executed on the computing device, cause the computing device to configure one or more regional power consumption thresholds, and each regional power consumption threshold may optionally define a collective power consumption budget for logical storage devices located within a respective region of a storage arrangement comprising the plurality of logical storage devices.

In Example 42, the at least one machine-readable medium of Example 41 may optionally comprise instructions that, in response to being executed on the computing device, cause the computing device to maintain one or more regional power consumption tallies corresponding to the one or more regional power consumption thresholds, and each regional power consumption tally may optionally comprise an estimated collective power consumption level for logical storage devices located within a region associated with a corresponding regional power consumption threshold.

In Example 43, the at least one machine-readable medium of any one of Examples 35 to 42 may optionally comprise instructions that, in response to being executed on the computing device, cause the computing device to configure one or more device power consumption thresholds, and each device power consumption threshold may optionally define a power consumption budget for a respective one of the plurality of logical storage devices.

In Example 44, the at least one machine-readable medium of Example 43 may optionally comprise instructions that, in response to being executed on the computing device, cause the computing device to maintain one or more device power consumption tallies corresponding to the one or more device power consumption thresholds, and each device power consumption tally may optionally comprise an estimated power consumption level for a logical storage device associated with a corresponding device power consumption threshold.

In Example 45, the at least one machine-readable medium of any one of Examples 35 to 44 may optionally comprise instructions that, in response to being executed on the computing device, cause the computing device to increment the global power consumption tally when the operation request is granted.

In Example 46, the at least one machine-readable medium of any one of Examples 35 to 45 may optionally comprise instructions that, in response to being executed on the computing device, cause the computing device to decrement the global power consumption tally to reflect completion of an operation by one of the plurality of logical storage devices.

In Example 47, the at least one machine-readable medium of Example 46 may optionally comprise instructions that, in response to being executed on the computing device, cause the computing device to determine the completion of the operation via periodic polling of the plurality of logical storage devices.

In Example 48, the at least one machine-readable medium of Example 46 may optionally comprise instructions that, in response to being executed on the computing device, cause the computing device to decrement the global power consumption tally to reflect completion of the operation when an elapsed time since commencement of the operation reaches an estimated performance time for the operation.

In Example 49, the at least one machine-readable medium of any one of Examples 35 to 48 may optionally comprise instructions that, in response to being executed on the computing device, cause the computing device to: measure a real-time power consumption level for the plurality of logical storage devices; and resolve the operation request based on the real-time power consumption level.

In Example 50, the at least one machine-readable medium of any one of Examples 35 to 49 may optionally comprise instructions that, in response to being executed on the computing device, cause the computing device to: receive system power information; select a power management configuration based on the system power information; and determine the global power consumption threshold based on the power management configuration.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing apparatus, comprising:
   a memory containing a machine readable medium comprising machine executable code having stored thereon instructions for performing a method of power management;
   a processor coupled to the memory, the processor configured to execute the machine executable code to cause the processor to:
      configure a global power consumption threshold defining an overall power consumption budget for a plurality of logical storage devices;
      maintain a global power consumption tally comprising an estimated total power consumption level for the plurality of logical storage devices;
      resolve an operation request based on the global power consumption threshold and the global power consumption tally; and
      update the global power consumption tally when an amount of time starting from commencement of the operation reaches a stored performance time for the operation.

2. The apparatus of claim 1, wherein the operation request identifies an operation to be performed by one of the plurality of logical storage devices.

3. The apparatus of claim 2, wherein the resolve the operation request is further based on an estimated power consumption cost of the operation.

4. The apparatus of claim 3, wherein the processor is further configured to execute the machine executable code to cause the processor to calculate a global available power value comprising a difference between the global power consumption threshold and the global power consumption tally.

5. The apparatus of claim 4, wherein the resolve the operation request is further based on a comparison of the estimated power consumption cost of the operation with the global available power value.

6. The apparatus of claim 5, wherein the processor is further configured to execute the machine executable code to cause the processor to defer the operation when the estimated power consumption cost of the operation is greater than the global available power value.

7. The apparatus of claim 1, wherein the processor is further configured to execute the machine executable code to cause the processor to configure one or more regional power consumption thresholds, each regional power consumption threshold defining a collective power consumption budget for logical storage devices located within a respective region of a storage arrangement comprising the plurality of logical storage devices.

8. The apparatus of claim 7, wherein the processor is further configured to execute the machine executable code to cause the processor to maintain one or more regional power consumption tallies corresponding to the one or more regional power consumption thresholds, each regional power consumption tally comprising an estimated collective power consumption level for logical storage devices located within a region associated with a corresponding regional power consumption threshold.

9. A method, comprising:
   determining, by a controller device, an estimated power consumption cost of an operation to be performed by one of a plurality of logical storage devices based on a received operation request;
   resolving, by the controller device, the operation based on the estimated power consumption cost, a global power consumption threshold, and a global power consumption tally for the plurality of logical storage devices; and
   updating, by the controller device, the global power consumption tally when an amount of time starting from commencement of the operation reaches a stored performance time for the operation.

10. The method of claim 9, wherein the global power consumption threshold defines an overall power consumption budget for the plurality of logical storage devices, the global power consumption tally comprising an estimated total power consumption level for the plurality of logical storage devices.

11. The method of claim 9, further comprising configuring, by the controller device, one or more regional power consumption thresholds, each regional power consumption threshold defining a collective power consumption budget for logical storage devices located within a respective region of a storage arrangement comprising the plurality of logical storage devices.

12. The method of claim 11, further comprising maintaining, by the controller device, one or more regional power consumption tallies corresponding to the one or more regional power consumption thresholds, each regional power consumption tally comprising an estimated collective power consumption level for logical storage devices located within a region associated with a corresponding regional power consumption threshold.

13. The method of claim 9, further comprising configuring, by the controller device, one or more device power consumption thresholds, each device power consumption threshold defining a power consumption budget for a respective one of the plurality of logical storage devices.

14. The method of claim 9, further comprising:
   receiving, by the controller device, system power information;
   selecting, by the controller device, a power management configuration based on the system power information; and
   determining, by the controller device, the global power consumption threshold based on the power management configuration.

15. A non-transitory machine-readable medium having stored thereon instructions for performing a method comprising machine executable code which when executed by a machine, causes the machine to:

determine an estimated power consumption cost of an operation to be performed by one of a plurality of logical storage devices based on a received operation request;

resolve the operation based on the estimated power consumption cost, a global power consumption threshold, and a global power consumption tally for the plurality of logical storage devices; and update the global power consumption tally when an amount of time starting from commencement of the operation reaches a stored performance time for the operation.

16. The non-transitory machine-readable medium of claim 15, the global power consumption threshold defining an overall power consumption budget for the plurality of logical storage devices, the global power consumption tally comprising an estimated total power consumption level for the plurality of logical storage devices.

17. The non-transitory machine-readable medium of claim 16, comprising instructions that, in response to being executed on the computing device, cause the computing device to calculate a global available power value comprising a difference between the global power consumption threshold and the global power consumption tally.

18. The non-transitory machine-readable medium of claim 17, comprising instructions that, in response to being executed on the computing device, cause the computing device to resolve the operation request based on a comparison of the estimated power consumption cost of the operation with the global available power value.

19. The non-transitory machine-readable medium of claim 18, comprising instructions that, in response to being executed on the computing device, cause the computing device to defer the operation when the estimated power consumption cost of the operation is greater than the global available power value.

20. The non-transitory machine-readable medium of claim 15, comprising instructions that, in response to being executed on the computing device, cause the computing device to decrement the global power consumption tally to reflect completion of an operation by one of the plurality of logical storage devices.

* * * * *